United States Patent
Ito et al.

(10) Patent No.: US 12,429,225 B2
(45) Date of Patent: Sep. 30, 2025

(54) GAS TURBINE SYSTEM

(71) Applicant: IHI Corporation, Tokyo (JP)

(72) Inventors: Shintaro Ito, Tokyo (JP); Masahiro Uchida, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 18/475,741

(22) Filed: Sep. 27, 2023

(65) Prior Publication Data

US 2024/0019124 A1 Jan. 18, 2024

Related U.S. Application Data

(63) Continuation of application No. PCT/JP2022/009180, filed on Mar. 3, 2022.

(30) Foreign Application Priority Data

Mar. 30, 2021 (JP) .................. 2021-057442

(51) Int. Cl.
*F02C 9/40* (2006.01)
*F02C 3/22* (2006.01)
*F23R 3/40* (2006.01)

(52) U.S. Cl.
CPC .................. *F23R 3/40* (2013.01); *F02C 3/22* (2013.01); *F02C 9/40* (2013.01); *F05D 2260/213* (2013.01)

(58) Field of Classification Search
CPC ...................................................... F02C 9/40
See application file for complete search history.

(56) References Cited

U.S. PATENT DOCUMENTS

| | | | | |
|---|---|---|---|---|
| 8,691,182 | B2 * | 4/2014 | Grannell | C01B 3/047 |
| | | | | 423/658.2 |
| 10,753,276 | B2 * | 8/2020 | Bulat | F02C 3/22 |
| 11,964,251 | B2 * | 4/2024 | Kambara | F02D 19/0644 |
| 2012/0047870 | A1 | 3/2012 | Kasuga et al. | |
| 2020/0018231 | A1 | 1/2020 | Ito et al. | |
| 2020/0032676 | A1 | 1/2020 | Nose et al. | |
| 2022/0193629 | A1 | 6/2022 | Kambara et al. | |
| 2024/0207808 | A1 | 6/2024 | Kambara et al. | |

FOREIGN PATENT DOCUMENTS

| | | |
|---|---|---|
| EP | 2317098 A1 | 5/2011 |
| EP | 3377745 B1 | 8/2019 |
| JP | H04-342829 A | 11/1992 |
| JP | H10-110630 A | 4/1998 |
| JP | 2006-77698 A | 3/2006 |
| JP | 2012-255420 A | 12/2012 |
| JP | 2016-191507 A | 11/2016 |
| JP | 2017-180266 A | 10/2017 |

(Continued)

*Primary Examiner* — Devon C Kramer
*Assistant Examiner* — Sean V Meiller
(74) *Attorney, Agent, or Firm* — Rothwell, Figg, Ernst & Manbeck, P.C.

(57) ABSTRACT

Provided is a gas turbine system, including: an ammonia tank; a combustor connected to the ammonia tank; an exhaust flow passage connected to the combustor; a turbine provided in the exhaust flow passage; a cracked-gas reservoir connected to the combustor; and an ammonia cracking catalyst, which is arranged on a downstream side of the turbine in the exhaust flow passage, and is connected to the ammonia tank and the cracked-gas reservoir.

20 Claims, 7 Drawing Sheets

(56) References Cited

FOREIGN PATENT DOCUMENTS

| | | |
|---|---|---|
| JP | 2018-076794 A | 5/2018 |
| JP | 2019-167265 A | 10/2019 |
| WO | 2010/082360 A1 | 7/2010 |
| WO | 2018/180773 A1 | 10/2018 |
| WO | 2020/217998 A1 | 10/2020 |

\* cited by examiner

GAS TURBINE SYSTEM

CROSS REFERENCE TO RELATED APPLICATIONS

This application is a continuation application of International Application No. PCT/JP2022/009180, filed on Mar. 3, 2022, which claims priority to Japanese Patent Application No. 2021-057442, filed on Mar. 30, 2021, the entire contents of which are incorporated by reference herein.

BACKGROUND ART

Technical Field

The present disclosure relates to a gas turbine system. This application claims the benefit of priority to Japanese Patent Application No. 2021-057442 filed on Mar. 30, 2021, and contents thereof are incorporated herein.

Related Art

A gas turbine system that combusts fuel in a combustor to obtain power has been used. As the gas turbine system, for example, there exists a gas turbine system that uses ammonia as fuel, as disclosed in Patent Literature 1. Emission of carbon dioxide is suppressed by using ammonia as fuel.

CITATION LIST

Patent Literature

Patent Literature 1: JP 2016-191507 A

SUMMARY

Technical Problem

Ammonia has a property of being less combustible than other fuels (specifically, has flame retardancy). Thus, in the combustor in which ammonia is used as fuel, ignition fails in some cases. Further, even when ignition is successfully performed, part of the fuel may be discharged without being combusted.

An object of the present disclosure is to provide a gas turbine system capable of improving combustibility in a combustor in which ammonia is used as fuel.

Solution to Problem

In order to solve the above-mentioned problem, according to the present disclosure, there is provided a gas turbine system, including: an ammonia tank; a combustor connected to the ammonia tank; an exhaust flow passage connected to the combustor; a turbine provided in the exhaust flow passage; a cracked-gas reservoir connected to the combustor; and an ammonia cracking catalyst, which is arranged on a downstream side of the turbine in the exhaust flow passage, and is connected to the ammonia tank and the cracked-gas reservoir.

A cooling device may be provided in a flow passage that connects the ammonia cracking catalyst and the cracked-gas reservoir to each other.

The cooling device may be a first heat exchanger provided in a flow passage that connects the ammonia cracking catalyst and the cracked-gas reservoir to each other, and a flow passage that connects the ammonia tank and the ammonia cracking catalyst to each other may pass through the first heat exchanger.

A second heat exchanger may be provided on a downstream side of the ammonia cracking catalyst in the exhaust flow passage, and a flow passage that connects the ammonia tank and the ammonia cracking catalyst to each other may pass through the second heat exchanger.

A first flow rate control valve may be provided in a flow passage that connects the ammonia tank and the ammonia cracking catalyst to each other, and the gas turbine system may include a controller configured to control the first flow rate control valve so that ammonia is supplied from the ammonia tank to the ammonia cracking catalyst during an operation of the gas turbine system.

A second flow rate control valve may be provided in a flow passage that connects the cracked-gas reservoir and the combustor to each other, a third flow rate control valve may be provided in a flow passage that connects the ammonia tank and the combustor to each other, and the controller may control the second flow rate control valve and the third flow rate control valve so that supply of the ammonia from the ammonia tank to the combustor is started after supply of a cracked gas from the cracked-gas reservoir to the combustor is started at the time of activation of the gas turbine system.

Effects of Disclosure

According to the present disclosure, it is possible to improve combustibility in the combustor in which ammonia is used as fuel.

DESCRIPTION OF EMBODIMENTS

Figure 1:
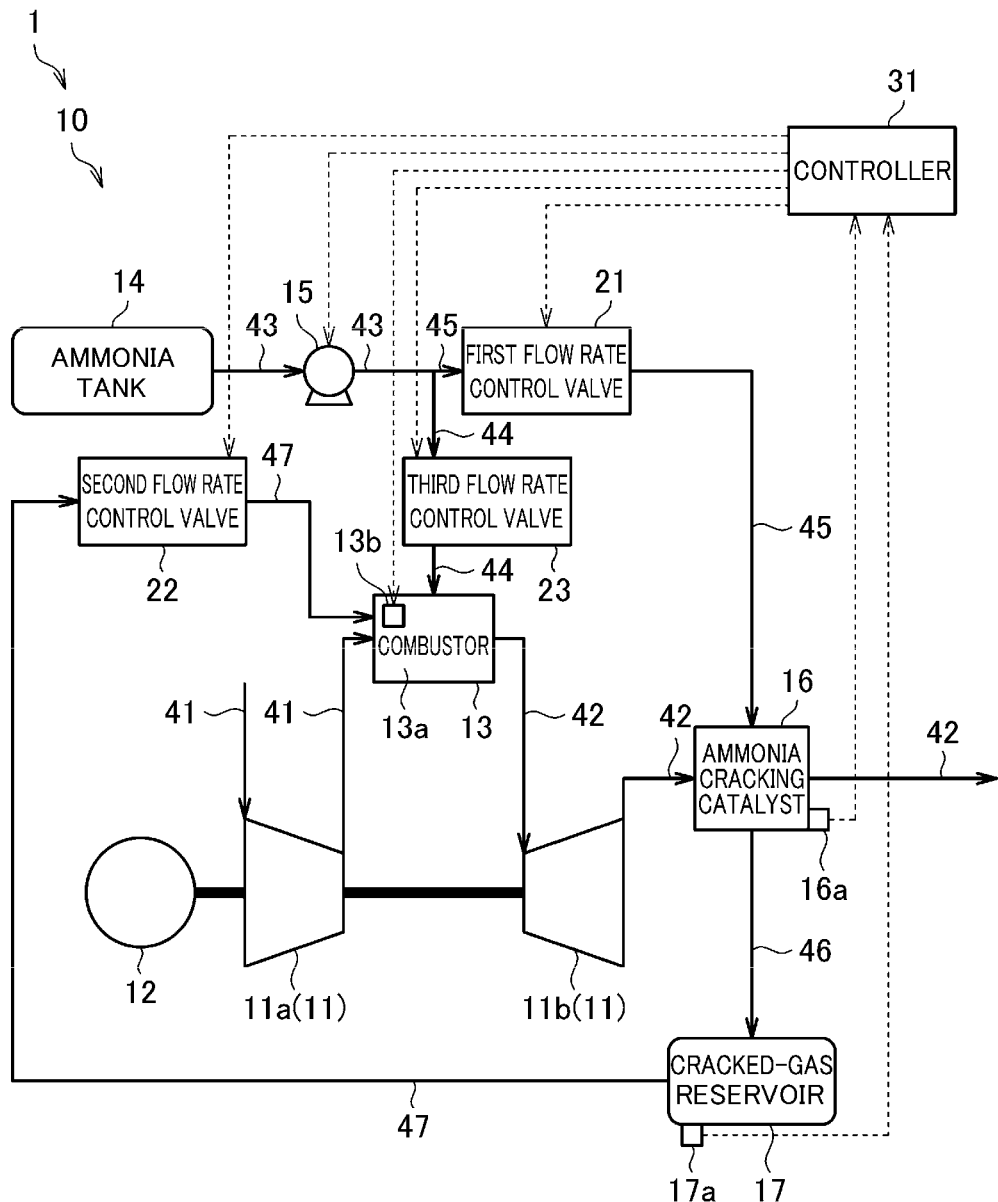
FIG. 1 is a schematic view for illustrating a configuration of a gas turbine system according to an embodiment of the present disclosure.

Now, with reference to the attached drawings, an embodiment of the present disclosure is described. The dimensions, materials, and other specific numerical values represented in the embodiment are merely examples used for facilitating the understanding of the disclosure, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is a schematic view for illustrating a configuration of a gas turbine system 1 according to this embodiment. As illustrated in FIG. 1, the gas turbine system 1 includes a turbocharger 11, a power generator 12, a combustor 13, an ammonia tank 14, a pump 15, an ammonia cracking catalyst 16, a cracked-gas reservoir 17, a first flow rate control valve 21, a second flow rate control valve 22, a third flow rate control valve 23, and a controller 31.

The combustor 13, the ammonia tank 14, the pump 15, the ammonia cracking catalyst 16, the cracked-gas reservoir 17, the first flow rate control valve 21, the second flow rate control valve 22, the third flow rate control valve 23, and the controller 31 of the gas turbine system 1 are included in a combustion device 10.

The turbocharger 11 includes a compressor 11a and a turbine 11b. The compressor 11a and the turbine 11b rotate integrally. The compressor 11a and the turbine 11b are coupled to each other through intermediation of a shaft.

The compressor 11a is provided in an intake flow passage 41 connected to the combustor 13. Air to be supplied to the combustor 13 flows through the intake flow passage 41. An intake port (not shown) is formed at an upstream-side end portion of the intake flow passage 41. The intake port allows air to be introduced from an outside. The air introduced through the intake port passes through the compressor 11a and is sent to the combustor 13. The compressor 11a compresses the air and discharges the compressed air to a downstream side.

The turbine 11b is provided in an exhaust flow passage 42 connected to the combustor 13. An exhaust gas discharged from the combustor 13 flows through the exhaust flow passage 42. An exhaust port (not shown) is formed at a downstream-side end portion of the exhaust flow passage 42. The exhaust port allows the exhaust gas to be discharged to the outside. The exhaust gas discharged from the combustor 13 passes through the turbine 11b and is sent to the exhaust port. The turbine 11b is rotated by the exhaust gas to generate rotational power.

The power generator 12 is connected to the turbocharger 11. The power generator 12 generates electric power with use of the rotational power generated by the turbocharger 11.

In the combustor 13, ammonia is used as fuel to cause combustion. As described later, for example, at the time of activation of the gas turbine system 1 (specifically, at the time of activation of the combustion device 10), fuel other than ammonia (for example, a cracked gas serving as fuel for ignition) is also used.

The combustor 13 includes a combustion chamber 13a and an ignition device 13b. The air compressed by the compressor 11a is supplied to the combustion chamber 13a through the intake flow passage 41. Fuel is supplied to the combustion chamber 13a. For example, liquid ammonia is supplied (more specifically, sprayed) as fuel to the combustion chamber 13a from the ammonia tank 14. An air-fuel mixture containing fuel and air is generated in the combustion chamber 13a. The ignition device 13b ignites the air-fuel mixture in the combustion chamber 13a. For example, the ignition device 13b is provided inside the combustion chamber 13a. An exhaust gas generated as a result of combustion in the combustion chamber 13a is discharged to the exhaust flow passage 42.

The liquid ammonia is stored in the ammonia tank 14. The ammonia tank 14 is connected to each of the combustor 13 and the ammonia cracking catalyst 16. In this manner, ammonia can be supplied from the ammonia tank 14 to each of the combustor 13 and the ammonia cracking catalyst 16.

A flow passage 43 is connected to the ammonia tank 14. A flow passage 44 and a flow passage 45 are connected to a downstream-side end portion of the flow passage 43. The flow passage 44 is connected to the combustor 13. That is, the ammonia tank 14 is connected to the combustor 13 through intermediation of the flow passage 43 and the flow passage 44. The liquid ammonia is supplied from the ammonia tank 14 to the combustor 13 (specifically, the combustion chamber 13a) via the flow passage 43 and the flow passage 44. The flow passage 45 is connected to the ammonia cracking catalyst 16. That is, the ammonia tank 14 is connected to the ammonia cracking catalyst 16 through intermediation of the flow passage 43 and the flow passage 45. The liquid ammonia is supplied from the ammonia tank 14 to the ammonia cracking catalyst 16 via the flow passage 43 and the flow passage 45.

The pump 15 is provided in the flow passage 43. The pump 15 feeds the ammonia supplied from the ammonia tank 14 to a downstream side. The ammonia fed by the pump 15 passes through the flow passage 43 and is sent to the flow passage 44 and the flow passage 45.

The third flow rate control valve 23 is provided in the flow passage 44. The third flow rate control valve 23 controls (that is, adjusts) a flow rate of ammonia flowing through the flow passage 44. Specifically, the third flow rate control valve 23 adjusts a supply amount of ammonia from the ammonia tank 14 to the combustor 13. The supply amount of ammonia from the ammonia tank 14 to the combustor 13 is adjusted through adjustment of an opening degree of the third flow rate control valve 23.

The first flow rate control valve 21 is provided in the flow passage 45. The first flow rate control valve 21 controls (that is, adjusts) a flow rate of ammonia flowing through the flow passage 45. Specifically, the first flow rate control valve 21 adjusts a supply amount of ammonia from the ammonia tank 14 to the ammonia cracking catalyst 16. The supply amount of ammonia from the ammonia tank 14 to the ammonia cracking catalyst 16 is adjusted through adjustment of an opening degree of the first flow rate control valve 21.

The ammonia cracking catalyst 16 cracks ammonia and generates a cracked gas. The ammonia cracking catalyst 16 cracks ammonia into hydrogen and nitrogen. Specifically, the cracked gas contains hydrogen and nitrogen. The cracked gas may contain uncracked ammonia in addition to hydrogen and nitrogen. The cracking of ammonia with the ammonia cracking catalyst 16 occurs only when a temperature of the ammonia cracking catalyst 16 is equal to or higher than a reference temperature (for example, from about 400° C. to about 500° C.). Specifically, when the temperature of the ammonia cracking catalyst 16 becomes equal to or higher than the reference temperature, the cracking of ammonia can actively occur with the ammonia cracking catalyst 16.

In this embodiment, the ammonia cracking catalyst 16 is arranged on a downstream side of the turbine 11b in the exhaust flow passage 42. Specifically, heat exchange between the ammonia cracking catalyst 16 and the exhaust gas in the exhaust flow passage 42 is enabled under a state in which an internal space of the ammonia cracking catalyst 16 and the exhaust flow passage 42 are not in communication with each other. The exhaust gas flowing through the exhaust flow passage 42 has a high temperature (for example, about 550° C.). Thus, the ammonia cracking catalyst 16 is heated to a temperature around which the cracking of ammonia actively occurs (specifically, a temperature equal to or higher than the reference temperature) with the exhaust gas flowing through the exhaust flow passage 42 during an operation of the gas turbine system 1 (specifically, during an operation of the combustion device 10).

A temperature sensor 16a is provided to the ammonia cracking catalyst 16. The temperature sensor 16a detects a temperature of the ammonia cracking catalyst 16.

The cracked-gas reservoir 17 stores a cracked gas. The cracked-gas reservoir 17 is connected to the ammonia cracking catalyst 16 through intermediation of a flow passage 46. The cracked gas generated as a result of cracking with the ammonia cracking catalyst 16 is sent to the cracked-gas reservoir 17 via the flow passage 46. For example, a check valve for preventing backflow of the cracked gas from the cracked-gas reservoir 17 to the ammonia cracking catalyst 16 or a shutoff valve may be provided in the flow passage 46.

A pressure sensor 17a is provided to the cracked-gas reservoir 17. The pressure sensor 17a detects a pressure in the cracked-gas reservoir 17.

The cracked-gas reservoir 17 is connected to the combustor 13 through intermediation of a flow passage 47. The cracked gas is supplied from the cracked-gas reservoir 17 via the flow passage 47 to the combustor 13 (specifically, the combustion chamber 13a).

The second flow rate control valve 22 is provided in the flow passage 47. The second flow rate control valve 22 controls (that is, adjusts) a flow rate of cracked gas flowing through the flow passage 47. Specifically, the second flow rate control valve 22 adjusts a supply amount of cracked gas from the cracked-gas reservoir 17 to the combustor 13. The supply amount of cracked gas from the cracked-gas reservoir 17 to the combustor 13 is adjusted through adjustment of an opening degree of the second flow rate control valve 22.

The controller 31 includes, for example, a central processing unit (CPU), a ROM that stores, for example, a program, and a RAM serving as a work area. The controller 31 controls the whole gas turbine system 1. For example, the controller 31 controls the ignition device 13b, the pump 15, the first flow rate control valve 21, the second flow rate control valve 22, and the third flow rate control valve 23. Further, the controller 31 acquires detection results from the temperature sensor 16a and the pressure sensor 17a.

Figure 2:
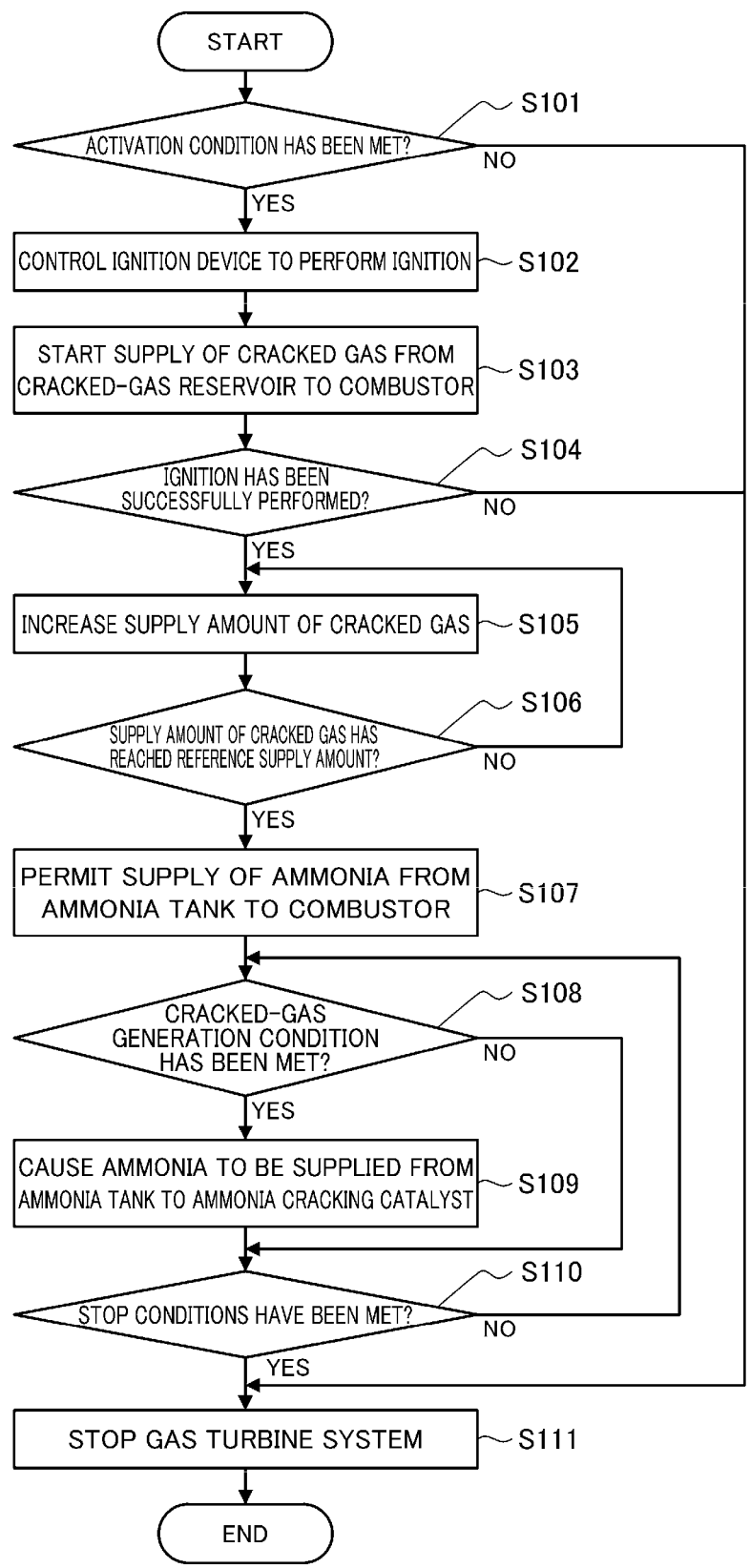
FIG. 2 is a flowchart for illustrating an example of flow of processing performed by a controller according to the embodiment of the present disclosure.

FIG. 2 is a flowchart for illustrating an example of flow of processing performed by the controller 31. The processing flow illustrated in FIG. 2 is executed, for example, when an input operation for activating the gas turbine system 1 is performed by a user. The input operation performed by the user is received by, for example, the controller 31.

After the processing flow illustrated in FIG. 2 is started, the controller 31 determines in Step S101 whether or not an activation condition has been met. The activation condition is a condition for permitting the activation of the gas turbine system 1. For example, the activation condition is that no abnormality has occurred in the devices of the gas turbine system 1 (for example, output values output from the devices include no abnormal value or no leakage of fluid from the flow passages has occurred).

When it is determined that the activation condition has been met (Step S101/YES), the processing proceeds to Step S102. Meanwhile, when it is determined that the activation condition has not been met (Step S101/NO), the processing proceeds to Step S111 and, as described later, the gas turbine system 1 is stopped.

When it is determined as YES in Step S101, the controller 31 causes the ignition device 13b to perform ignition in Step S102. Next, in Step S103, the controller 31 starts the supply of the cracked gas from the cracked-gas reservoir 17 to the combustor 13. Specifically, the controller 31 controls the second flow rate control valve 22 so that the supply of the cracked gas from the cracked-gas reservoir 17 to the combustor 13 is started. Specifically, the controller 31 opens the second flow rate control valve 22 that is in a closed state.

As described later, in the gas turbine system 1, during the operation of the gas turbine system 1, the cracked gas is generated with the ammonia cracking catalyst 16, and the generated cracked gas is stored in the cracked-gas reservoir 17. Thus, at the time of start of the processing flow illustrated in FIG. 2, the cracked gas is already stored in the cracked-gas reservoir 17. However, at the time of first activation of the gas turbine system 1, the cracked gas is already stored in the cracked-gas reservoir 17 by other method.

As described above, in this embodiment, at the time of activation of the gas turbine system 1, ignition is performed under a state in which the cracked gas is supplied to the combustor 13. Specifically, the cracked gas is used as fuel for ignition. Unlike ammonia, hydrogen contained in the cracked gas is combustible and thus is more likely to be ignited. Hence, a failure in ignition is suppressed, and reliability of ignition is improved.

Next, in Step S104, the controller 31 determines whether or not ignition has been successfully performed. When it is determined that the ignition has been successfully performed (Step S104/YES), the processing proceeds to Step S105. Meanwhile, when it is determined that the ignition has not been successfully performed (Step S104/NO), the processing proceeds to Step S111 and, as described later, the gas turbine system 1 is stopped.

When it is determined as YES in Step S104, the controller 31 increases a supply amount of the cracked gas in Step S105. Specifically, the controller 31 controls the second flow rate control valve 22 so that the supply amount of the cracked gas from the cracked-gas reservoir 17 to the combustor 13 is increased. That is, the controller 31 increases the opening degree of the second flow rate control valve 22. For example, the controller 31 increases the supply amount of the cracked gas from the cracked-gas reservoir 17 to the combustor 13 in a preset change pattern.

Next, in Step S106, the controller 31 determines whether or not the supply amount of the cracked gas has reached a reference supply amount. For example, the reference supply amount is set to a value around which combustibility in the combustor 13 is maintained at a predetermined level or higher (specifically, non-combustion of part of ammonia is suppressed) even after the supply of ammonia to the combustor 13 is started.

When it is determined that the supply amount of the cracked gas has reached the reference supply amount (Step S106/YES), the controller 31 determines the combustibility in the combustor 13 is maintained at the predetermined level or higher even after the supply of ammonia to the combustor 13 is started, and the processing proceeds to Step S107. Meanwhile, when it is determined that the supply amount of the cracked gas has not reached the reference supply amount (Step S106/NO), the controller 31 determines that the combustibility in the combustor 13 becomes lower than the predetermined level after the supply of ammonia to the combustor 13 is started, and the processing returns to Step S105.

When it is determined as YES in Step S106, the controller 31 permits the supply of ammonia from the ammonia tank 14 to the combustor 13 in Step S107. Specifically, when a required output for the gas turbine system 1 is equal to or larger than a reference output, the controller 31 starts the supply of ammonia from the ammonia tank 14 to the combustor 13. In this case, the controller 31 drives the pump 15 and controls the third flow rate control valve 23 so that the supply of ammonia from the ammonia tank 14 to the combustor 13 is started. Specifically, the controller 31 opens the third flow rate control valve 23 that is in a closed state. As a result, combustion using ammonia as fuel is started. When the required output for the gas turbine system 1 is smaller than the reference output, the supply of ammonia from the ammonia tank 14 to the combustor 13 is not required.

In the gas turbine system 1, the combustion using ammonia as fuel is started under a state in which the cracked gas is supplied to the combustor 13 and the combustibility is maintained at the predetermined level or higher. Specifically, the cracked gas is used as auxiliary fuel (specifically, fuel for combustion aid). As a result, non-combustion of part of ammonia is suppressed. After the supply of ammonia to the combustor 13 is started, the controller 31 may continue or stop the supply of the cracked gas to the combustor 13.

Next, in Step S108, the controller 31 determines whether or not a cracked-gas generation condition has been met. The cracked-gas generation condition is a condition for permitting the generation of the cracked gas (specifically, cracking of ammonia) with the ammonia cracking catalyst 16. For example, the cracked-gas generation condition is that a temperature of the ammonia cracking catalyst 16 has become equal to or higher than a reference temperature (specifically, around a temperature at which the cracking of ammonia with the ammonia cracking catalyst 16 actively occurs).

When it is determined that the cracked-gas generation condition has been met (Step S108/YES), the processing proceeds to Step S109. Meanwhile, when it is determined that the cracked-gas generation condition has not been met (Step S108/NO), Step S109 is not carried out and the processing proceeds to Step S110.

When it is determined as YES in Step S108, the controller 31 causes ammonia to be supplied from the ammonia tank 14 to the ammonia cracking catalyst 16 in Step S109. Specifically, the controller 31 controls the first flow rate control valve 21 so that ammonia is supplied from the ammonia tank 14 to the ammonia cracking catalyst 16. More specifically, the controller 31 opens the first flow rate control valve 21 that is in a closed state. As a result, the cracking of ammonia with the ammonia cracking catalyst 16 generates a cracked gas. Then, the generated cracked gas is sent to the cracked-gas reservoir 17, and a pressure in the cracked-gas reservoir 17 increases.

In Step S109, the controller 31 controls the supply amount of ammonia to the ammonia cracking catalyst 16 by using the first flow rate control valve 21 so that the pressure in the cracked-gas reservoir 17 becomes equal to a reference pressure. Specifically, the above-mentioned control of the supply amount of ammonia to the ammonia cracking catalyst 16 (specifically, the control of the opening degree of the first flow rate control valve 21) is achieved by feedback control. The reference pressure is an index for determination of whether or not the cracked gas of an amount that is required as the amount of cracked gas to be used until the start of the supply of ammonia to the combustor 13 (hereinafter referred to simply as "required amount" of the cracked gas) is stored in the cracked-gas reservoir 17. For example, when the pressure in the cracked-gas reservoir 17 is lower than the reference pressure, the required amount of cracked gas is not stored in the cracked-gas reservoir 17.

Next, in Step S110, the controller 31 determines whether or not stop conditions have been met. The stop conditions are conditions for permitting the stop of the gas turbine system 1. For example, the stop conditions are that a request for power generation is no longer issued and the pressure in the cracked-gas reservoir 17 has become equal to or higher than the reference pressure.

When it is determined that the stop conditions have been met (Step S110/YES), the processing proceeds to Step S111. Meanwhile, when it is determined that the stop conditions have not been met (Step S110/NO), the processing returns to Step S108.

When it is determined as YES in Step S110, the controller 31 stops the gas turbine system 1 in Step S111, and the processing flow illustrated in FIG. 2 ends. Specifically, the controller 31 stops the supply of ammonia to the combustor 13, the supply of the cracked gas to the combustor 13, and the supply of ammonia to the ammonia cracking catalyst 16 to thereby stop the gas turbine system 1.

As described above, when the pressure in the cracked-gas reservoir 17 is lower than the reference pressure, the controller 31 does not stop the gas turbine system 1 and continues the supply of ammonia from the ammonia tank 14 to the ammonia cracking catalyst 16. As a result, after the pressure in the cracked-gas reservoir 17 returns to the reference pressure or a higher pressure, the gas turbine system 1 can be stopped.

As described above, in the gas turbine system 1, the ammonia cracking catalyst 16 is arranged on the downstream side of the turbine 11$b$ in the exhaust flow passage 42. Thus, the ammonia cracking catalyst 16 is heated to a temperature around which the cracking of ammonia actively occurs (specifically, a temperature equal to or higher than the reference temperature) with the exhaust gas flowing through the exhaust flow passage 42. As described above, the heating of the ammonia cracking catalyst 16 can be achieved by effectively using the heat of the exhaust gas flowing through the exhaust flow passage 42. Thus, the heating of the ammonia cracking catalyst 16 is achieved without using a dedicated heater.

Further, in the gas turbine system 1, the ammonia cracking catalyst 16 is connected to the combustor 13 through intermediation of the cracked-gas reservoir 17. As a result, ammonia is cracked with the ammonia cracking catalyst 16 to generate the cracked gas and thus the cracked gas can be stored in the cracked-gas reservoir 17 during the operation of the gas turbine system 1. Then, at the time of next activation of the gas turbine system 1, ignition is performed with use of the cracked gas stored in the cracked-gas reservoir 17. As a result, a failure in ignition can be suppressed, and the reliability of ignition can be improved.

As described above, with the gas turbine system 1, the combustibility in the combustor 13 can be improved.

In particular, the controller 31 controls the first flow rate control valve 21 so that ammonia is supplied from the ammonia tank 14 to the ammonia cracking catalyst 16 during an operation of the gas turbine system 1 (specifically, during an operation of the combustion device 10). Thus, the cracked gas can be generated with the ammonia cracking catalyst 16 and can be stored in the cracked-gas reservoir 17 in an appropriate manner during the operation of the gas turbine system 1.

In particular, the controller 31 controls the second flow rate control valve 22 and the third flow rate control valve 23 so that supply of the ammonia from the ammonia tank 14 to the combustor 13 is started after supply of the cracked gas from the cracked-gas reservoir 17 to the combustor 13 is started at the time of activation of the gas turbine system 1 (specifically, at the time of activation of the combustion device 10). Thus, at the time of activation of the gas turbine system 1, the cracked gas is used as fuel for ignition. As a result, a failure in ignition in the combustor 13 is suppressed, and the improvement of reliability of ignition can be appropriately achieved.

Now, with reference to FIG. 3 to FIG. 7, gas turbine systems according to modification examples are described. In the gas turbine systems according to modification examples described below, processing performed by the controller 31 is similar to that performed by the controller 31 in the gas turbine system 1 described above, and thus description thereof is omitted.

Figure 3:
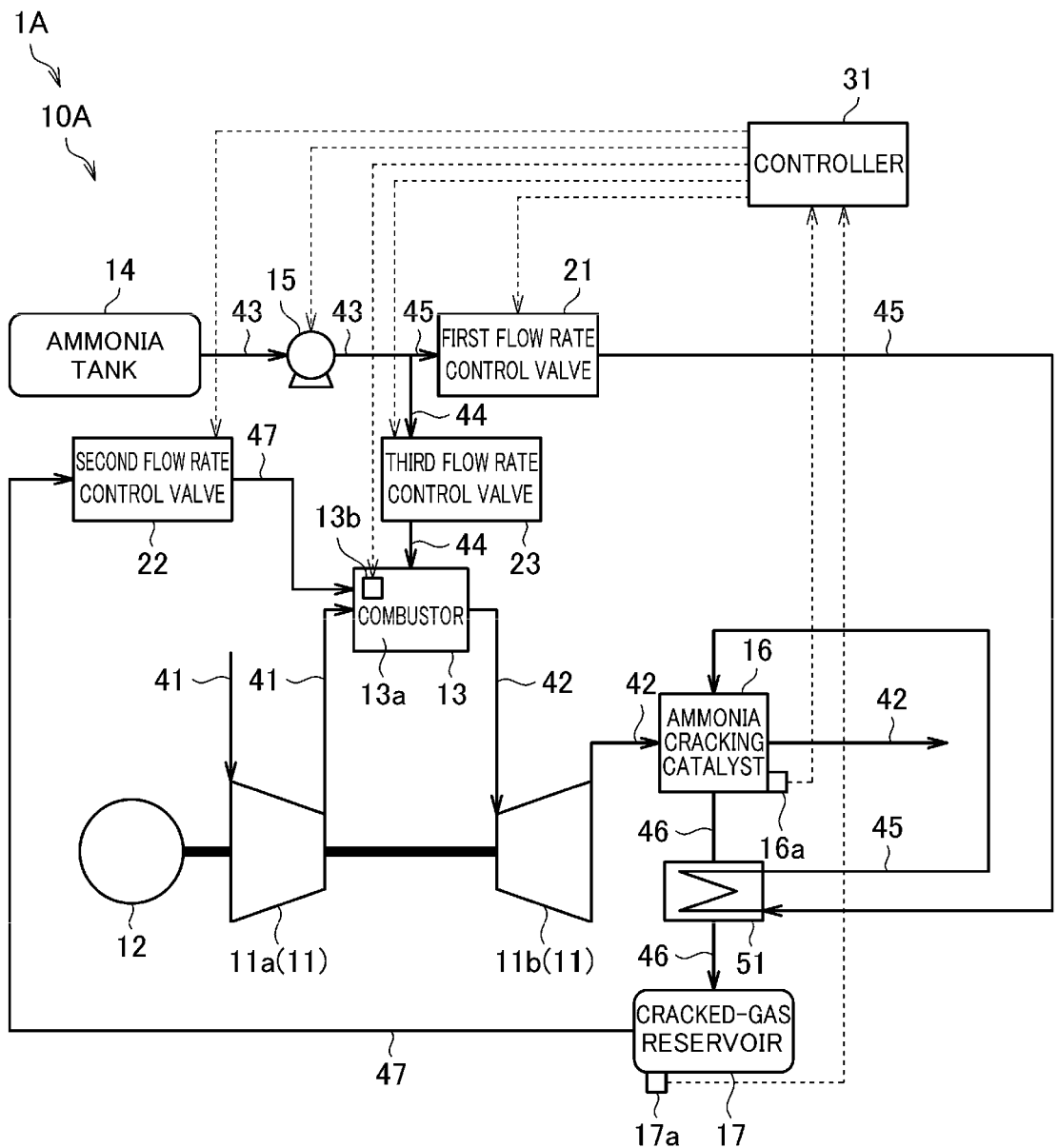
FIG. 3 is a schematic view for illustrating a configuration of a gas turbine system according to a first modification example.

FIG. 3 is a schematic view for illustrating a configuration of a gas turbine system 1A according to a first modification example. As illustrated in FIG. 3, the gas turbine system 1A according to the first modification example is different from the gas turbine system 1 described above in that a heat exchanger 51 is provided in the flow passage 46 and in that the flow passage 45 passes through the heat exchanger 51. The heat exchanger 51 corresponds to one example of a first heat exchanger according to the present disclosure.

In the first modification example, the combustor 13, the ammonia tank 14, the pump 15, the ammonia cracking catalyst 16, the cracked-gas reservoir 17, the first flow rate control valve 21, the second flow rate control valve 22, the third flow rate control valve 23, the controller 31, and the heat exchanger 51 of the gas turbine system 1A are included in a combustion device 10A.

As described above, the flow passage 46 connects the ammonia cracking catalyst 16 and the cracked-gas reservoir 17 to each other. The heat exchanger 51 is provided in such flow passage 46. As described above, the flow passage 45 connects the ammonia tank 14 and the ammonia cracking catalyst 16 to each other. Such flow passage 45 passes through the heat exchanger 51.

In the heat exchanger 51, a cracked gas flowing through the flow passage 46 and ammonia flowing through the flow passage 45 exchange heat. A temperature of the cracked gas flowing through the flow passage 46 is higher than a temperature of ammonia flowing through the flow passage 45. Thus, in the heat exchanger 51, heat is transferred from the cracked gas flowing through the flow passage 46 to ammonia flowing through the flow passage 45. Thus, the cracked gas flowing through the flow passage 46 is cooled. As described above, the heat exchanger 51 corresponds to a cooling device that cools the cracked gas flowing through the flow passage 46.

A temperature of the cracked gas sent to the cracked-gas reservoir 17 is high (for example, about 500° C.). However, a temperature of the cracked gas in the cracked-gas reservoir 17 decreases in a period from the time of stop of the gas turbine system 1 to the time of next activation. As the amount of decrease in temperature of the cracked gas in the cracked-gas reservoir 17 increases, a pressure in the cracked-gas reservoir 17 significantly decreases.

In the gas turbine system 1A, the cooling device (specifically, the heat exchanger 51) is provided in the flow passage 46 that connects the ammonia cracking catalyst 16 and the cracked-gas reservoir 17 to each other. As a result, the temperature of the cracked gas sent to the cracked-gas reservoir 17 can be decreased. Thus, the amount of decrease in temperature of the cracked gas in the cracked-gas reservoir 17 can be reduced in a period from the time of stop of the gas turbine system 1 to the time of next activation. Thus, a reduction in pressure in the cracked-gas reservoir 17 can be suppressed. In this manner, the pressure in the cracked-gas reservoir 17 can be set higher than a pressure in a combustion chamber 13a. Thus, the cracked gas can be appropriately supplied from the cracked-gas reservoir 17 to the combustor 13.

There has been described above an example in which the heat exchanger 51 through which the flow passage 45 passes is provided as a cooling device in the flow passage 46. However, the cooling device provided in the flow passage 46 is not limited to the heat exchanger 51. For example, a device that cools the cracked gas flowing through the flow passage 46 with use of cooling water or air may be provided as a cooling device in the flow passage 46.

Figure 4:
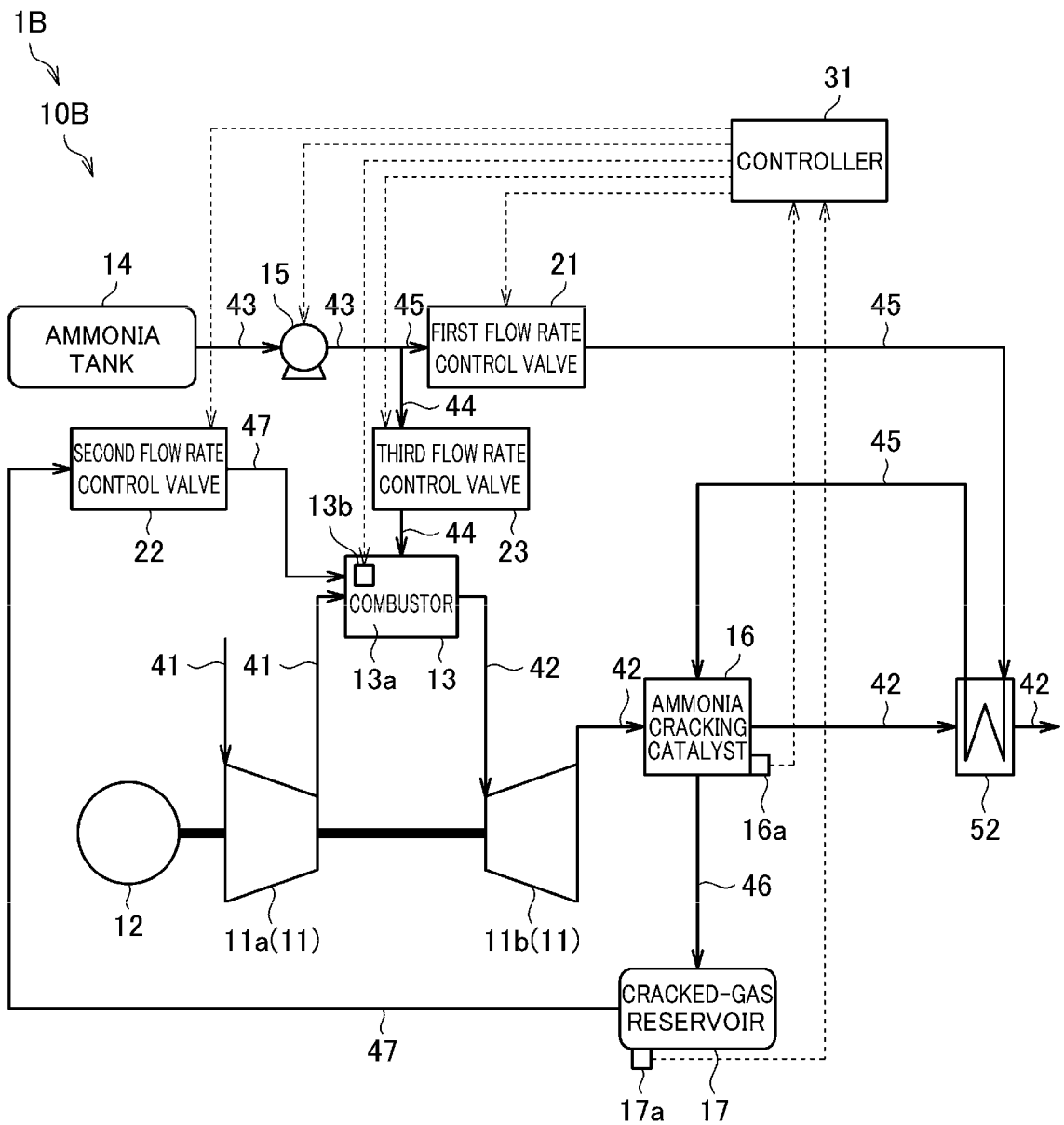
FIG. 4 is a schematic view for illustrating a configuration of a gas turbine system according to a second modification example.

FIG. 4 is a schematic view for illustrating a configuration of a gas turbine system 1B according to a second modification example. As illustrated in FIG. 4, the gas turbine system 1B according to the second modification example is different from the gas turbine system 1 described above in that a heat exchanger 52 is provided in the exhaust flow passage 42 and in that the flow passage 45 passes through the heat exchanger 52. The heat exchanger 52 corresponds to one example of a second heat exchanger according to the present disclosure.

In the second modification example, the combustor 13, the ammonia tank 14, the pump 15, the ammonia cracking catalyst 16, the cracked-gas reservoir 17, the first flow rate control valve 21, the second flow rate control valve 22, the third flow rate control valve 23, the controller 31, and the heat exchanger 52 of the gas turbine system 1B are included in a combustion device 10B.

The heat exchanger 52 is provided on a downstream side of the ammonia cracking catalyst 16 in the exhaust flow passage 42. As described above, the flow passage 45 connects the ammonia tank 14 and the ammonia cracking catalyst 16 to each other. Such flow passage 45 passes through the heat exchanger 52.

In the heat exchanger 52, ammonia flowing through the flow passage 45 and an exhaust gas flowing through the exhaust flow passage 42 exchange heat. A temperature of the exhaust gas flowing through the exhaust flow passage 42 is higher than a temperature of ammonia flowing through the flow passage 45. Thus, in the heat exchanger 51, heat is transferred from the exhaust gas flowing through the exhaust flow passage 42 to ammonia flowing through the flow passage 45. Thus, the ammonia flowing through the flow passage 45 is heated and vaporized.

In the gas turbine system 1B, the ammonia flowing through the flow passage 45 is heated in the heat exchanger 52 with the exhaust gas flowing through the exhaust flow passage 42, and then is sent to the ammonia cracking catalyst 16. Thus, efficiency of the cracking of ammonia with the ammonia cracking catalyst 16 is improved. Hence, a cracked gas can be efficiently stored in the cracked-gas reservoir 17.

Figure 5:
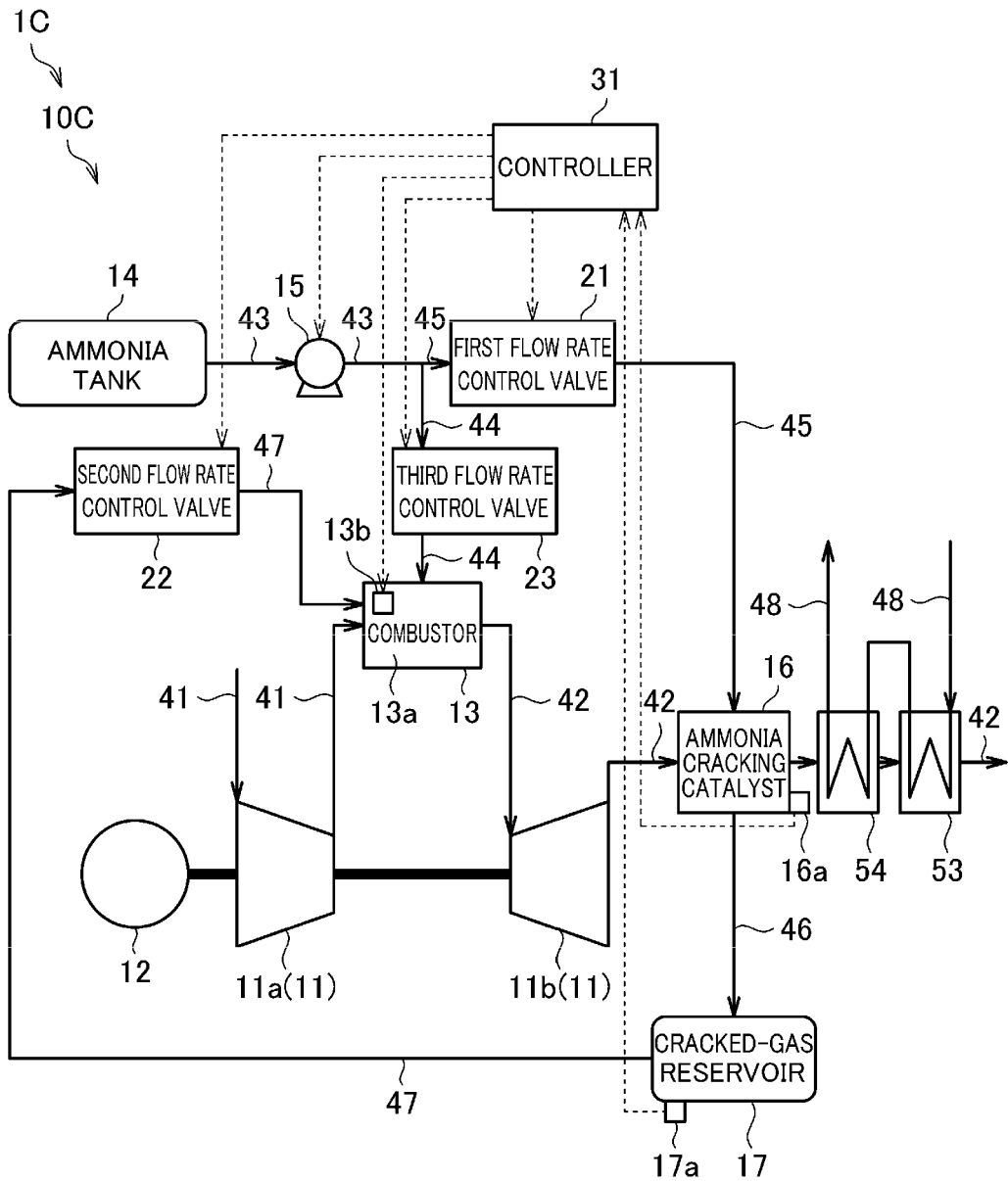
FIG. 5 is a schematic view for illustrating a configuration of a gas turbine system according to a third modification example.

FIG. 5 is a schematic view for illustrating a configuration of a gas turbine system 1C according to a third modification example. As illustrated in FIG. 5, the gas turbine system 1C according to the third modification example is different from the gas turbine system 1 described above in that a heat exchanger 53 and a heat exchanger 54 are provided in the exhaust flow passage 42 and in that a flow passage 48 passes through the heat exchanger 53 and the heat exchanger 54.

In the third modification example, the combustor 13, the ammonia tank 14, the pump 15, the ammonia cracking catalyst 16, the cracked-gas reservoir 17, the first flow rate control valve 21, the second flow rate control valve 22, the third flow rate control valve 23, and the controller 31 of the gas turbine system 1C are included in a combustion device 10C.

Water flows through the flow passage 48. Although the flow passage 48 is illustrated in a simplified manner in FIG. 5, the flow passage 48 forms a closed circuit. Specifically, water circulates through the flow passage 48. A turbine (not shown) is provided in the flow passage 48. Power is obtained by the turbine with use of flow of water (specifically, steam). The flow passage 48, the heat exchanger 53, the heat exchanger 54, and the turbine (not shown) are included in another system different from the gas turbine system 1C. Details of the above-mentioned another system are described with reference to FIG. 7.

The heat exchanger 53 is provided on a downstream side of the heat exchanger 54 in the exhaust flow passage 42. The heat exchanger 53 is provided on an upstream side of the heat exchanger 54 in the flow passage 48. In the heat exchanger 53, liquid water flowing through the flow passage 48 is heated with an exhaust gas flowing through the exhaust flow passage 42. Then, the heated liquid water is heated again with the exhaust gas flowing through the exhaust flow passage 42 in the heat exchanger 54 to be vaporized into gas (specifically, steam). Then, the turbine (not shown) is rotated by the steam to thereby generate rotational power.

As described above, a part of the gas turbine system 1C is shared by another system. A configuration and a purpose of use of another system having a part shared by the gas turbine system 1C are not limited to those in the example described above. In such a case, effects obtained by the gas turbine system 1 described above are produced. In an example of FIG. 5, the ammonia cracking catalyst 16 is arranged on an upstream side of the heat exchanger 53 and the heat exchanger 54 in the exhaust flow passage 42. Thus, the ammonia cracking catalyst 16 can be effectively heated with the exhaust gas. However, the ammonia cracking catalyst 16 may be arranged between the heat exchanger 54 and the heat exchanger 53 or on a downstream side of the heat exchanger 53 in the exhaust flow passage 42.

Figure 6:
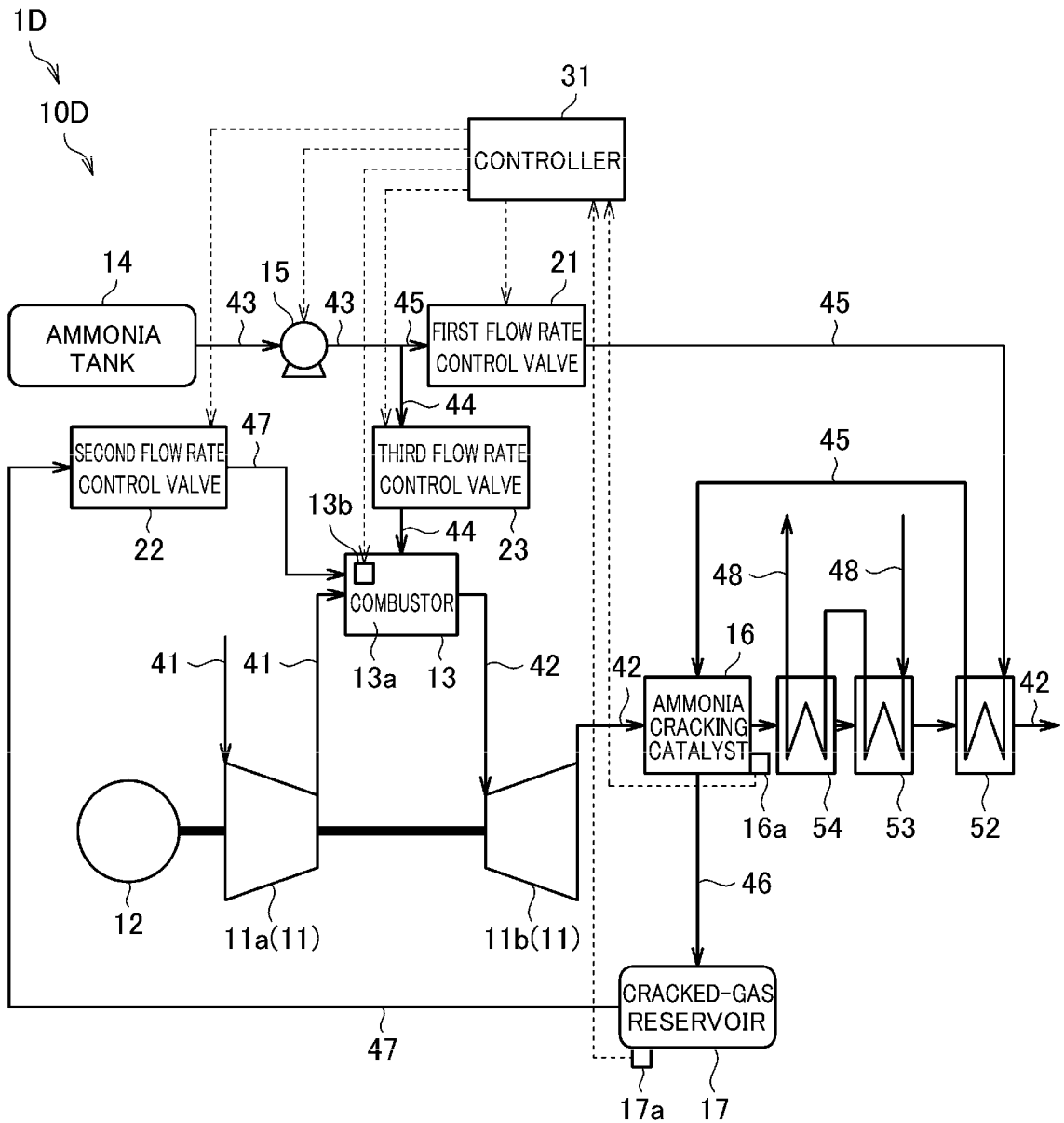
FIG. 6 is a schematic view for illustrating a configuration of a gas turbine system according to a fourth modification example.

FIG. 6 is a schematic view for illustrating a configuration of a gas turbine system 1D according to a fourth modification example. As illustrated in FIG. 6, the gas turbine system 1D according to the fourth modification example is different from the gas turbine system 1C described above in that the heat exchanger 52 is provided in the exhaust flow passage 42 and in that the flow passage 45 passes through the heat exchanger 52. The heat exchanger 52 is provided on the downstream side of the heat exchanger 53 in the exhaust flow passage 42.

In the fourth modification example, the combustor 13, the ammonia tank 14, the pump 15, the ammonia cracking catalyst 16, the cracked-gas reservoir 17, the first flow rate control valve 21, the second flow rate control valve 22, the third flow rate control valve 23, the controller 31, and the heat exchanger 52 of the gas turbine system 1D are included in a combustion device 10D.

As in the combustion device 10B of the gas turbine system 1B described above, in the gas turbine system 1D, ammonia flowing through the flow passage 45 is heated in the heat exchanger 52 with an exhaust gas flowing through the exhaust flow passage 42, and then is sent to the ammonia cracking catalyst 16. Thus, the efficiency of the cracking of ammonia with the ammonia cracking catalyst 16 is improved as compared to that in the gas turbine system 1C described above. Hence, the cracked gas can be efficiently stored in the cracked-gas reservoir 17. Further, when the heat exchanger 52 is added to the gas turbine system 1C described above, it is preferred that the heat exchanger 52 be provided on the downstream side of the heat exchanger 53 in the exhaust flow passage 42. Ammonia vaporizes at a relatively low temperature (for example, about 60° C. at 2 Mpa). Thus, also in the above-mentioned case, ammonia can be vaporized in the heat exchanger 52. Further, an ammonia cracking promoting effect is achieved by adding the heat exchanger 52, and improvement of efficiency as a whole power generation system is achieved by the heat exchanger 53 and the heat exchanger 54.

In the gas turbine system 1D, however, the exhaust gas flowing through the exhaust flow passage 42 is cooled in the heat exchanger 54 and the heat exchanger 53, and then is further cooled in the heat exchanger 52. Thus, the exhaust gas has a low temperature on the downstream side in the exhaust flow passage 42 as compared to that in the gas turbine system 1C described above. Hence, it is preferred that, for example, stainless steel be used as a material of members for forming the exhaust flow passage 42 and the heat exchanger 52 so as to suppress occurrence of dew condensation in the exhaust flow passage 42 and the heat exchanger 52.

Figure 7:
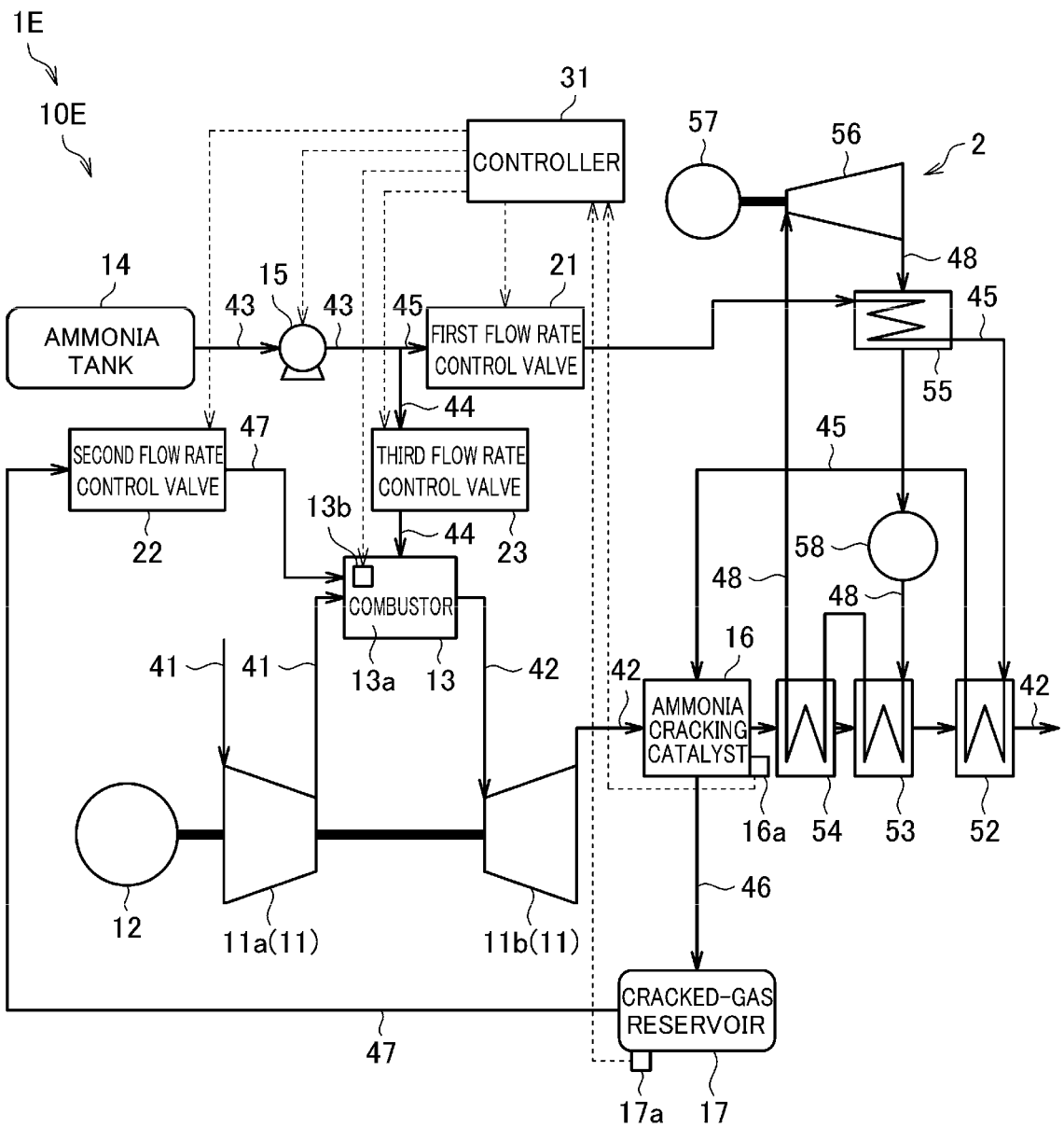
FIG. 7 is a schematic view for illustrating a configuration of a gas turbine system according to a fifth modification example.

FIG. 7 is a schematic view for illustrating a configuration of a gas turbine system 1E according to a fifth modification example. As illustrated in FIG. 7, the gas turbine system 1E according to the fifth modification example is different from the gas turbine system 1D described above in that a heat exchanger 55 is provided in the flow passage 48 and in that the flow passage 45 passes through the heat exchanger 55.

In the fifth modification example, the combustor 13, the ammonia tank 14, the pump 15, the ammonia cracking catalyst 16, the cracked-gas reservoir 17, the first flow rate control valve 21, the second flow rate control valve 22, the third flow rate control valve 23, the controller 31, the heat exchanger 52, and the heat exchanger 55 of the gas turbine system 1E are included in a combustion device 10E.

In FIG. 7, part of a system 2 including the flow passage 48, which is not shown in FIG. 5 and FIG. 6, is also illustrated. The system 2 is a power generation system including the flow passage 48, the heat exchanger 53, the heat exchanger 54, the heat exchanger 55, a turbine 56, a power generator 57, and a drum 58. As described above, liquid water flowing through the flow passage 48 is heated and vaporized into gas (specifically, steam) in the heat exchanger 53 and the heat exchanger 54. The turbine 56 is provided on a downstream side of the heat exchanger 54 in the flow passage 48. The turbine 56 is rotated by the steam flowing through the flow passage 48 to thereby generate rotational power.

The power generator 57 is connected to the turbine 56. The power generator 57 generates electric power with use of the rotational power generated by the turbine 56. The heat exchanger 55 and the drum 58 are arranged in the stated order from an upstream side so as to be located on a downstream side of the turbine 56 and on an upstream side of the heat exchanger 53 in the flow passage 48. The steam that has passed through the turbine 56 and ammonia flowing through the flow passage 45 exchange heat in the heat exchanger 55. The steam that has passed through the turbine 56 is cooled in the heat exchanger 55 with the ammonia flowing through the flow passage 45. Part of the steam passing through the heat exchanger 55 is liquified. Then, the steam or water that has passed through the heat exchanger 55 is supplied to the drum 58. The water is sent from the drum 58 to the heat exchanger 53.

In the gas turbine system 1E, the ammonia flowing through the flow passage 45 is heated in the heat exchanger 55 with the steam flowing through the flow passage 48. After that, ammonia flowing through the flow passage 45 is heated again in the heat exchanger 52 with an exhaust gas flowing through the exhaust flow passage 42, and then is sent to the ammonia cracking catalyst 16. Thus, the efficiency of the cracking of ammonia with the ammonia cracking catalyst 16 is improved as compared to that in the gas turbine system 1D described above. Hence, the cracked gas can be efficiently stored in the cracked-gas reservoir 17.

In an example of FIG. 7, the heat exchanger 52 is provided in the exhaust flow passage 42, and the flow passage 45 passes through the heat exchanger 52. However, the heat exchanger 52 may be omitted from the example of FIG. 7. In this case, the ammonia flowing through the flow passage 45 passes through the heat exchanger 55, and then is sent to the ammonia cracking catalyst 16 without exchanging heat with the exhaust gas flowing through the exhaust flow passage 42. As a result, the degree of cooling of the exhaust gas flowing through the exhaust flow passage 42 is decreased, and thus a reduction in temperature of the exhaust gas on the downstream side in the exhaust flow passage 42 is suppressed. Thus, the degree of freedom in selection of a material for a member that forms the exhaust flow passage 42 is improved.

The embodiment of the present disclosure has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

There have been described above examples in which the rotational power generated by the turbocharger 11 is used as energy for driving the power generator 12 in the gas turbine system 1, the gas turbine system 1A, the gas turbine system 1B, the gas turbine system 1C, the gas turbine system 1D, and the gas turbine system 1E. However, the rotational power generated by the turbocharger 11 in the gas turbine system 1, the gas turbine system 1A, the gas turbine system 1B, the gas turbine system 1C, the gas turbine system 1D, and the gas turbine system 1E may be used for other purposes of use (for example, for the purpose of driving a mobile body such as a vessel).

There have been described above examples in which liquid ammonia is mainly supplied to the combustor 13 and the ammonia cracking catalyst 16 in the gas turbine system 1, the gas turbine system 1A, the gas turbine system 1B, the gas turbine system 1C, the gas turbine system 1D, and the gas turbine system 1E. Specifically, gaseous ammonia is supplied to the ammonia cracking catalyst 16 in the gas turbine system 1B, the gas turbine system 1D, and the gas turbine system 1E. However, gaseous ammonia may be supplied to the combustor 13 and the ammonia cracking catalyst 16 in the gas turbine system 1, the gas turbine system 1A, the gas turbine system 1B, the gas turbine system 1C, the gas turbine system 1D, and the gas turbine system 1E. For example, a vaporizer may be provided on a downstream side of the pump 15 so that ammonia is supplied to the combustor 13 or the ammonia cracking catalyst 16 after being vaporized by the vaporizer. In this case, an accumulator may be provided on a downstream side of the vaporizer. The vaporizer and the accumulator may be provided in the flow passage 43 or may be provided in the flow passage 44 and the flow passage 45, respectively.

There has been described above the gas turbine system 1A corresponding to the gas turbine system 1, in which the cooling device (specifically, the heat exchanger 51) is additionally provided in the flow passage 46. However, the cooling device (specifically, the heat exchanger 51) may be additionally provided in the flow passage 46 in the gas turbine system 1B, the gas turbine system 1C, the gas turbine system 1D, and the gas turbine system 1E.

The invention claimed is:

1. A gas turbine system comprising:
    an ammonia tank;
    a combustor connected to the ammonia tank;
    an exhaust flow passage connected to the combustor;
    a turbine provided in the exhaust flow passage;
    a cracked-gas reservoir connected to the combustor;
    an ammonia cracking catalyst, which is arranged on a downstream side of the turbine in the exhaust flow passage, and is connected to the ammonia tank and the cracked-gas reservoir; and
    a controller,
    wherein the controller of the gas turbine system is configured to, during an operation of the gas turbine system, determine whether or not a temperature of the ammonia cracking catalyst has become equal to or higher than a reference temperature and, when the gas turbine system has determined that the temperature of the ammonia cracking catalyst has become equal to or higher than the reference temperature, control so that ammonia is supplied from the ammonia tank to the ammonia cracking catalyst, and
    wherein the controller of the gas turbine system is configured to, during an operation of the gas turbine system, (i) control a supply amount of ammonia from the ammonia tank to the ammonia cracking catalyst so that pressure in the cracked-gas reservoir becomes equal to a reference pressure, (ii) not stop the gas turbine system and continue supply of ammonia from the ammonia tank to the ammonia cracking catalyst when the pressure in the cracked-gas reservoir is lower than the reference pressure, and (iii) stop the gas turbine system when the pressure in the cracked-gas reservoir has become equal to or higher than the reference pressure, and
    wherein the controller of the gas turbine system is configured to, at the time of activation of the gas turbine system, control so that supply of ammonia from the ammonia tank to the combustor is started after supply of a cracked gas from the cracked-gas reservoir to the combustor is started.

2. The gas turbine system according to claim 1, wherein a cooling device is provided in a flow passage that connects the ammonia cracking catalyst and the cracked-gas reservoir to each other.

3. The gas turbine system according to claim 2,
    wherein the cooling device is a first heat exchanger provided in a flow passage that connects the ammonia cracking catalyst and the cracked-gas reservoir to each other, and
    wherein a flow passage that connects the ammonia tank and the ammonia cracking catalyst to each other passes through the first heat exchanger.

4. The gas turbine system according to claim 3,
    wherein a second heat exchanger is provided on a downstream side of the ammonia cracking catalyst in the exhaust flow passage, and wherein a flow passage that connects the ammonia tank and the ammonia cracking catalyst to each other passes through the second heat exchanger.

5. The gas turbine system according to claim 4,
wherein a first flow rate control valve is provided in a flow passage that connects the ammonia tank and the ammonia cracking catalyst to each other, and
wherein the controller is configured to control the first flow rate control valve so that ammonia is supplied from the ammonia tank to the ammonia cracking catalyst during an operation of the gas turbine system.

6. The gas turbine system according to claim 5,
wherein a second flow rate control valve is provided in a flow passage that connects the cracked-gas reservoir and the combustor to each other,
wherein a third flow rate control valve is provided in a flow passage that connects the ammonia tank and the combustor to each other, and
wherein the controller controls the second flow rate control valve and the third flow rate control valve so that supply of the ammonia from the ammonia tank to the combustor is started after supply of the cracked gas from the cracked-gas reservoir to the combustor is started at the time of activation of the gas turbine system.

7. The gas turbine system according to claim 3,
wherein a first flow rate control valve is provided in a flow passage that connects the ammonia tank and the ammonia cracking catalyst to each other, and
wherein the controller is configured to control the first flow rate control valve so that ammonia is supplied from the ammonia tank to the ammonia cracking catalyst during an operation of the gas turbine system.

8. The gas turbine system according to claim 7,
wherein a second flow rate control valve is provided in a flow passage that connects the cracked-gas reservoir and the combustor to each other,
wherein a third flow rate control valve is provided in a flow passage that connects the ammonia tank and the combustor to each other, and
wherein the controller controls the second flow rate control valve and the third flow rate control valve so that supply of the ammonia from the ammonia tank to the combustor is started after supply of the cracked gas from the cracked-gas reservoir to the combustor is started at the time of activation of the gas turbine system.

9. The gas turbine system according to claim 2,
wherein a second heat exchanger is provided on a downstream side of the ammonia cracking catalyst in the exhaust flow passage, and
wherein a flow passage that connects the ammonia tank and the ammonia cracking catalyst to each other passes through the second heat exchanger.

10. The gas turbine system according to claim 9,
wherein a first flow rate control valve is provided in a flow passage that connects the ammonia tank and the ammonia cracking catalyst to each other, and
wherein the controller is configured to control the first flow rate control valve so that ammonia is supplied from the ammonia tank to the ammonia cracking catalyst during an operation of the gas turbine system.

11. The gas turbine system according to claim 10,
wherein a second flow rate control valve is provided in a flow passage that connects the cracked-gas reservoir and the combustor to each other,
wherein a third flow rate control valve is provided in a flow passage that connects the ammonia tank and the combustor to each other, and
wherein the controller controls the second flow rate control valve and the third flow rate control valve so that supply of the ammonia from the ammonia tank to the combustor is started after supply of the cracked gas from the cracked-gas reservoir to the combustor is started at the time of activation of the gas turbine system.

12. The gas turbine system according to claim 2,
wherein a first flow rate control valve is provided in a flow passage that connects the ammonia tank and the ammonia cracking catalyst to each other, and
wherein the controller is configured to control the first flow rate control valve so that ammonia is supplied from the ammonia tank to the ammonia cracking catalyst during an operation of the gas turbine system.

13. The gas turbine system according to claim 12,
wherein a second flow rate control valve is provided in a flow passage that connects the cracked-gas reservoir and the combustor to each other,
wherein a third flow rate control valve is provided in a flow passage that connects the ammonia tank and the combustor to each other, and
wherein the controller controls the second flow rate control valve and the third flow rate control valve so that supply of the ammonia from the ammonia tank to the combustor is started after supply of the cracked gas from the cracked-gas reservoir to the combustor is started at the time of activation of the gas turbine system.

14. The gas turbine system according to claim 1,
wherein a second heat exchanger is provided on a downstream side of the ammonia cracking catalyst in the exhaust flow passage, and
wherein a flow passage that connects the ammonia tank and the ammonia cracking catalyst to each other passes through the second heat exchanger.

15. The gas turbine system according to claim 14,
wherein a first flow rate control valve is provided in a flow passage that connects the ammonia tank and the ammonia cracking catalyst to each other, and
wherein the controller is configured to control the first flow rate control valve so that ammonia is supplied from the ammonia tank to the ammonia cracking catalyst during an operation of the gas turbine system.

16. The gas turbine system according to claim 15,
wherein a second flow rate control valve is provided in a flow passage that connects the cracked-gas reservoir and the combustor to each other,
wherein a third flow rate control valve is provided in a flow passage that connects the ammonia tank and the combustor to each other, and
wherein the controller controls the second flow rate control valve and the third flow rate control valve so that supply of the ammonia from the ammonia tank to the combustor is started after supply of the cracked gas from the cracked-gas reservoir to the combustor is started at the time of activation of the gas turbine system.

17. The gas turbine system according to claim 1,
wherein a first flow rate control valve is provided in a flow passage that connects the ammonia tank and the ammonia cracking catalyst to each other, and
wherein the controller is configured to control the first flow rate control valve so that ammonia is supplied from the ammonia tank to the ammonia cracking catalyst during an operation of the gas turbine system.

18. The gas turbine system according to claim 17,
wherein a second flow rate control valve is provided in a flow passage that connects the cracked-gas reservoir and the combustor to each other,
wherein a third flow rate control valve is provided in a flow passage that connects the ammonia tank and the combustor to each other, and
wherein the controller controls the second flow rate control valve and the third flow rate control valve so that supply of the ammonia from the ammonia tank to the combustor is started after supply of the cracked gas from the cracked-gas reservoir to the combustor is started at the time of activation of the gas turbine system.

19. The gas turbine system according to claim 18, wherein the controller includes a central processing unit, a read-only memory, and a random-access memory.

20. The gas turbine system according to claim 1, wherein the controller includes a central processing unit, a read-only memory, and a random-access memory.

\* \* \* \* \*